Figure 1:
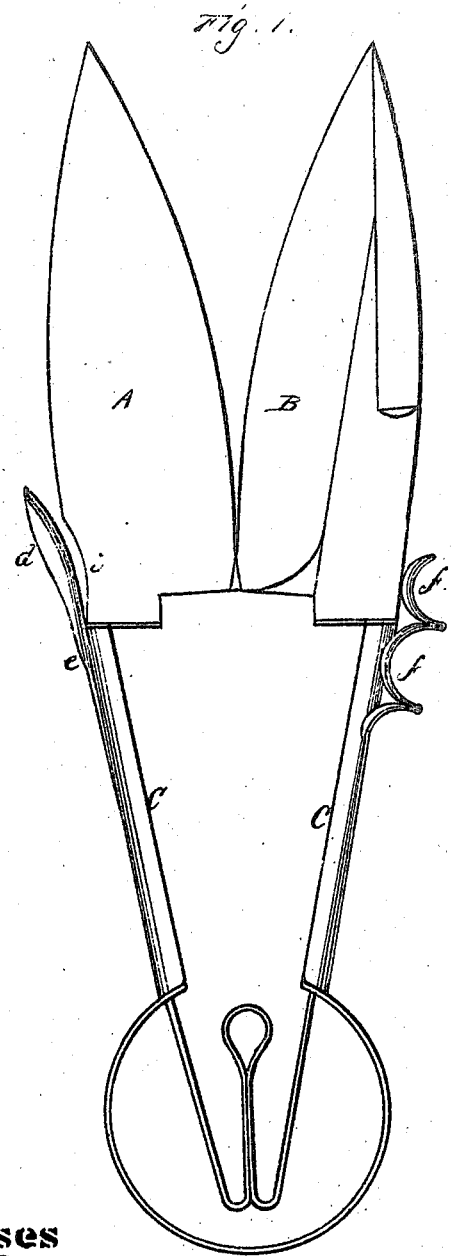

A. S. McWILLIAMS.
Sheep-Shears.

No. 140,292.    Patented June 24, 1873.

Witnesses
John L. Boone
C. N. Richardson

Inventor
Andrew S. McWilliams
per Dewey & Co.
Att'ys

UNITED STATES PATENT OFFICE.

ANDREW S. McWILLIAMS, OF COLUSA, CALIFORNIA.

IMPROVEMENT IN SHEEP-SHEARS.

Specification forming part of Letters Patent No. 140,292, dated June 24, 1873; application filed April 21, 1873.

*To all whom it may concern:*

Be it known that I, ANDREW S. McWILLIAMS, of Colusa, Colusa county, State of California, have invented Improvements in Sheep-Shears; and I do hereby declare the following description and accompanying drawings are sufficient to enable any person skilled in the art or science to which it most nearly appertains to make and use my said invention or improvement without further invention or experiment.

The object of my invention is to provide an attachment to the blades of sheep-shears, by which the thumb and fingers of the person using them are protected and supported.

My improvement consists in providing a suitable elastic rest and guard upon the back of one blade of the shears for the thumb, and also a rest upon the shank of the opposite blade of the shears for one or more fingers of the hand, so that both the thumb and fingers of the hand will be protected, and the grasp upon the shears rendered more secure, while the fingers cannot slip from the blades along the handle.

In order to more fully illustrate and explain my invention, reference is had to the accompanying drawing forming a part of this specification, in which—

Figure 1 is a side view of my shears.

A and B represent the two blades of an ordinary pair of sheep-shears, and C C the shank. To the shank of the blade A I secure one end of a prolonged concave or cup-shaped plate, $d$, which is of a suitable form to fit the ball or inside of the thumb, and provide a rest for it. This guard will also serve to protect the thumb from being cut by the opposite blade, in case the two blades should slip past each other. By cutting away a small portion, $i$, of the back edge of the blade below the thumb-rest, as represented, the plate or rest will be given a slight springing motion as the pressure is applied, and removed when the shears are being used, thus relieving the thumb from the dead pressure which would otherwise result. To the back edge of the opposite blade B and its shank I secure one or more semi-rings or saddles, $f$, in the proper position to receive and provide a seat for one or more fingers of the hand, thus giving the person using the shears a better and more convenient hold upon the shears.

If desired, entire rings might be used in place of the semi-rings on account of the facility they furnish to grasp the shears and drop them quickly when necessary.

By this means I greatly improve the ordinary sheep-shears, so as to render them convenient and easy to operate, and at the same time giving the shearer better control of the shears, so that there will be less danger of cutting the sheep.

I am aware that sheep-shears have been made with a rest on one blade for the thumb, and a rest on the other blade for the finger; but, in the former case, there is no spring-attachment to the blade, and in the latter the rest merely acts as a guard to prevent the hand slipping on the blades while shearing, and does not aid in a secure grasp of the shears.

Having thus described my invention, what I claim, and desire to secure by Letters Patent, is—

1. The thumb-rest $d$, when attached as described, in combination with the recess $i$ in the back of the blade, substantially as described, and for the purpose set forth.

2. The blade B of a pair of sheep-shears, having the finger-rests or saddles $f$, substantially as and for the purpose above described.

In witness whereof I hereunto set my hand and seal.

ANDREW SHANNON McWILLIAMS. [L. S.]

Witnesses:
J. W. GOAD,
W. F. GOAD.